United States Patent [19]

Ushiro et al.

[11] Patent Number: 4,611,255
[45] Date of Patent: Sep. 9, 1986

[54] ROTATING HEAD ASSEMBLY

[75] Inventors: Tatsuzo Ushiro, Tokyo; Takashi Narasawa, Kanagawa; Makoto Fujiki; Hiroo Edakubo, both of Tokyo, all of Japan

[73] Assignee: Canon Kabushiki Kaisha, Tokyo, Japan

[21] Appl. No.: 400,081

[22] Filed: Jul. 20, 1982

[30] Foreign Application Priority Data

| Jul. 28, 1981 [JP] | Japan | 56-117095 |
| Jul. 28, 1981 [JP] | Japan | 56-117096 |
| Jul. 28, 1981 [JP] | Japan | 56-117097 |
| Jul. 28, 1981 [JP] | Japan | 56-117098 |
| Aug. 12, 1981 [JP] | Japan | 56-125281 |
| Aug. 12, 1981 [JP] | Japan | 56-125282 |
| Dec. 9, 1981 [JP] | Japan | 56-196880 |

[51] Int. Cl.$^4$ .................................... G11B 5/027
[52] U.S. Cl. .................................... 360/84; 360/107; 358/906
[58] Field of Search .................... 360/84–85, 360/107; 358/906

[56] References Cited

U.S. PATENT DOCUMENTS

| 4,163,256 | 7/1979 | Adcock | 358/906 |
| 4,316,225 | 2/1982 | Maruyama | 360/107 |
| 4,354,211 | 10/1982 | Gilovich | 360/85 X |
| 4,408,239 | 10/1983 | Ushiro | 360/84 X |

Primary Examiner—S. J. Heinz
Attorney, Agent, or Firm—Toren, McGeady, Stanger, Goldberg & Kiel

[57] ABSTRACT

A rotating head assembly comprises a fixed lower drum; a rotating member which has at least one head and also has a void hole in a position corresponding to the axis of rotation; supporting means which is disposed in a position farther away from the axis of rotation than the void hole and is arranged to support the rotating member rotatably relative to the fixed lower drum; and at least one composing means which is arranged by utilizing the void hole to compose at least a portion of the rotating head assembly.

14 Claims, 27 Drawing Figures (A)

(B)

ROTATING HEAD ASSEMBLY

BACKGROUND OF THE INVENTION

1. Field of the Invention

This invention relates to an improvement on the conventional rotating head assembly adapted for use, for example, in a magnetic video recording/reproducing apparatus or the like.

2. Description of the Prior Art

Portable video tape recorders have become popular as a result of efforts to reduce the size of rotating head type magnetic video recording/reproducing device. To meet this tendency, efforts have been exerted also to reduce the size and thickness of the rotating head assemblies to be used for the portable video tape recorders. Such efforts, however, are now approaching a structurally allowable limit.

Further, there have appeared rotating head type magnetic video recording/reproducing apparatuses of the kind having a camera combined therewith. The apparatuses of this kind are more strongly desired to have further reduction in size and weight. Typical examples of the conventional head assemblies used for such video tape recorders and video tape recorders of another type having a camera combined therewith are as described below:

FIG. 1 of the accompanying drawing shows the example of the conventional rotating head assembly, which is of an upper drum rotating system. Referring to FIG. 1, a fixed lower drum 1 has a rotation shaft 2 disposed in the middle part thereof. The rotation shaft 2 is rotatably mounted on the fixed lower drum 1 by means of bearings 3 and 4. A rotating upper drum 5 which is opposed to the fixed lower drum 1 is mounted on a support member 6 by mounting screws 7. The support member 6 is secured to the rotation shaft 2 by a mounting screw 8 and is disposed above the bearing 3. The rotating upper drum 5 is thus arranged to be rotatable relative to the fixed lower drum 1. At least one head base plate 10 which has a magnetic head 9 is mounted on the rotating upper drum 5 by means of screws 11. A travelling face 12 for a magnetic tape is formed on the peripheral faces of the rotating upper drum 5 and the fixed lower drum 1. To the support member 6 is attached a rotating-side winding 13 of a rotary transformer. Meanwhile, a stationary-side winding 14 of the rotary transformer is attached to the fixed lower drum 1 and is opposed to the winding 13. The winding 13 is connected to the magnetic head 9. Incoming or outgoing signals to or from the magnetic head 9 is arranged to go through the electromagnetic coupling of the rotary transformer.

Another support member 15 is mounted on the rotation shaft 2 and is disposed below the bearing 4. A rotary yoke 17 of a motor 16 is mounted on the support member 15 by means of a screw 18. A rotary magnet 19 is secured to the rotary yoke 17. A stator 20 and a stator coil 21 are secured to the fixed lower drum 1 and are opposed to the rotary magnet 19. The fixed lower drum 1 is mounted on a mount 22 which is disposed within a magnetic video recording/reproducing apparatus. The upper part of the rotating head assembly 24 which is arranged in this manner is covered by a cover 25 of the magnetic video recording/reproducing apparatus.

In a magnetic video recording/reproducing apparatus using a rotating head assembly which is arranged as shown in FIG. 1, the rotating upper drum 5 is mounted on the rotation shaft 2 and the rotation shaft is arranged to be carried by the bearings 3 and 4. Such being the arrangement, if the spacing distance between these bearings 3 and 4 is short, the rotation locus of the magnetic head 9 would be greatly affected and would be prevented from making a precise rotation by a tilt of the rotation shaft 2 resulting from deviation of these bearings 3 and 4 from their prescribed relative positions. Because of this problem, it has been extremely difficult to reduce the thickness of the rotating head assembly in the axial direction thereof.

In addition to this problem, the adjustment of the height, angle and protruding extent of the magnetic head 9 relative to the fixed lower drum 1 is difficult. Accordingly, even in cases where some parts must be replaced due to a damage of the magnetic head 9, the work required for this is not limited to mere replacement work on the parts but the height, etc. of the magnetic head 9 must be readjusted. The conventional rotating head assembly thus has been presenting another problem in terms of interchangeability of parts and this has been hindering to improvement in serviceability.

Further, in the case of the assembly shown in FIG. 1, the mounting screw 23 is tightened by inserting a screw driver into a space between the motor 16 and the mount 22. However, the space is too small to facilitate the work. In some cases, the mounting screw is arranged to be tightened from the surface side of the mount 22. In such a case, however, the various mechanisms arranged round the fixed lower drum 1 have worsened the workability.

In the case of a system having a camera combined into one unified body with the rotating head type magnetic video recording/reproducing apparatus, the optical path of the optical system of the camera must be obtained by avoiding the various parts of the rotating head type video recording/reproducing apparatus. This has been hindering attempts to reduce the size of the system. Besides, in such a system, driving means for automatically carrying out a focusing operation by driving an automatic focusing mechanism or driving means for driving a zoom lens to automatically carry out adjustment of a focal point occupies a large space to present a further hindrance to reduction in size.

The rotating head assembly 24 is disposed in the middle part of the magnetic video recording/reproducing apparatus. Besides, on the periphery of the assembly, there are arranged a magnetic tape travel guide, a loading mechanism for pulling the magnetic tape out of a cassette and for placing it on the rotating head assembly 24, etc. Therefore, a cover 25 is generally carried by a peripheral part of the magnetic video recording/reproducing apparatus to keep it away from the rotating head assembly 24. The cover must have a sufficient strength against external pressure which might be applied from outside as indicated by an arrow A. Even if the cover 25 is deformed and bent inward by the external pressure, the cover must be prevented from coming into contact with the rotating head assembly 24. Therefore, in the conventional system of this type, the thickness of the cover 25 is arranged to be thick and the cover is disposed sufficiently away from the rotating head assembly 24. This also has been hindering reduction in size and weight of a magnetic video recording/reproducing apparatus.

FIG. 2 shows an example of the conventional rotating head assembly of a head-on-propeller rotating system. The components similar to those shown in FIG. 1 are indicated by the same reference numerals as those used in FIG. 1. A cylindrical fixed upper drum 26 and a fixed lower drum 1 are fixed in prescribed relative positions by a coupling member 27 and mounting screws 28 and 29. The peripheral faces of the two drums 26 and 1 are arranged to serve as tape travelling surface 12. A guide 30 which guides a magnetic tape (which is not shown) is formed on the peripheral face of the fixed lower drum 1. At the common center of the two drums 1 and 26, there is provided a rotation shaft 2. The rotation shaft 2 is rotatably mounted on the fixed lower drum 1 by means of bearings 3 and 4. A head bar 31 is secured to the rotation shaft 2 by a screw 8. A head plate 32 is fitted on the head bar 31 and is secured thereto. At least one head base plate 10 which has a magnetic head 9 is secured to the head plate 32 by means of mounting screws 11.

In the lower part of the rotation shaft 2, a support member 15 is secured to the rotation shaft 2 in such a manner as to expel the plays of the bearings 3 and 4 in the axial direction of the rotation shaft. With this arrangement, the bearings 3 and 4 have a pre-load imposed thereon. The rotary yoke 15 of a motor 16 is secured to the support member 15 by means of a mounting screw 18. A rotary magnet 19 and a magnet sensor 33 for detecting the position of the magnetic head 9 are mounted on the rotary yoke 15. A stator 20 and a stator coil 21 are secured to the fixed lower drum 1 and are opposed to the rotary magnet 19. A reference numeral 34 indicates a printed circuit board for the motor 19; and 35 indicates a sensor for detecting the phase of the rotary magnet 19. The magnet sensor 33 is arranged not only to detect the position of the magnetic head 9 but also to detect the rotating state of the magnetic head 9 for controlling the normal rotating state of the head 9.

The rotating head assembly of the head-on-propeller rotating system which is arranged as described above with reference to FIG. 2 also has the same shortcomings as the rotating head assembly of the upper-drum rotating system shown in FIG. 1. These shortcomings likewise have been hindering efforts to reduce the size and thickness of the rotating head assembly and, as a result of that, also have been hindering efforts to reduce the size and weight of the magnetic video recording/reproducing apparatus.

In the rotating head assembly described above, the fixed drum 26 and the fixed lower drum 1 are joined together at their peripheral parts by means of the coupling member 27. However, since this arrangement necessitates to tighten the mounting screws 28 and 29 from a lateral direction, the fixed upper drum 26 tends to be deformed by this lateral tightening force. Further, a very high degree of positional precision is required for retaining the two drums 26 and 1 in a prescribed relative positions. However, in the conventionally practiced method of adjusting the relative positions of them, thin washers measuring 5 to 6μ is inserted between the coupling member 27 and the drums 26 and 1 before tightening. Therefore, much time has been required for the adjustment work.

As described in the foregoing with reference to FIGS. 1 and 2, the conventional rotating head assemblies have been hindering the efforts to reduce the size and thickness thereof. As a result of that, reduction in size and weight of an apparatus using such a rotating head assembly has been difficult.

SUMMARY OF THE INVENTION

It is an object of this invention to provide a rotating head assembly which permits reduction in size and thickness thereof. More broadly stated, the invention is directed to reduction in size and weight of a magnetic video recording/reproducing apparatus or the like using a rotating head assembly.

It is another object of the invention to provide a rotating head assembly which facilitates adjustment of the position of the head and has improved interchangeability of parts required at the time of replacing the head.

It is a further object of the invention to provide a rotating head assembly which has excellent workability for mounting it on a mount.

It is another object of the invention to provide a rotating head assembly which permits use of a thin cover member and reduction of spacing distance between the cover member and the rotating head assembly.

It is a further object of the invention to provide a rotating head assembly which includes fixed drums in the upper and lower parts thereof and in which the fixed upper drum is free from the fear of deformation and the relative positions of the fixed upper and lower drums can be adjusted without difficulty.

It is a still further object of the invention to provide a rotating head assembly which permits reduction in size of a magnetic video recording/reproducing system having a camera and a recording/reproducing apparatus arranged into one unified body.

These and other objects, features and advantages of the invention will become apparent from the detailed description of preferred embodiments thereof taken in connection with the accompanying drawings.

DETAILED DESCRIPTION OF PREFERRED EMBODIMENTS

Figure 3:
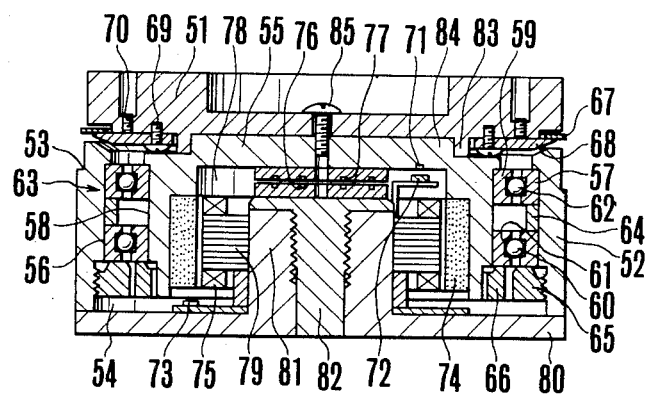
FIG. 3 is a sectional view showing a rotating head assembly as an embodiment of the present invention.

FIG. 3 shows a rotating head assembly as an embodiment of the invention. In this case the invention is applied to an upper drum rotating system. A tape travel surface is formed by the peripheral faces of a rotating upper drum 51 and a fixed lower drum 52. A tape guide 53 which is arranged to guide a tape (not shown) is provided on the peripheral face of the fixed lower drum 52. A rotating member support 55 is disposed within the inner space 54 of the fixed lower drum 52. The rotating member support 55 is opposed to a confronting inner circumferential face 56 which is located close to the outer circumferential face of the fixed lower drum 52. Two fixed annular members 57 are disposed on this inner circumferential face 56. Meanwhile, on the outer circumferential face 58 of the rotating member support 55 which is opposed to the inner circumferential face 56, there are disposed two rotating annular members 59. Annular groove parts 60 and 61 are respectively provided in the fixed annular member 57 and the rotating annular member 59. A plurality of steel balls 62 are inserted in between the two annular groove parts 60 and 61. The fixed annular member 57, the rotating annular member 59 and the steel balls 62 jointly form two rolling bearings 63. The rotating member support 55 is carried by these two rolling bearings 63 in such a way as to be rotatable relative to the fixed lower drum 52. The two rolling bearings 63 are spaced by a spacer 64 and are fixed in place with tightening rings 65 and 66 screwed to the rotating member support 55 and the fixed lower drum 52. A head base plate 68 which has a magnetic head 67 is mounted on the rotating upper drum 51 by means of mounting screws 69. The height of the magnetic head 67 is arranged to be adjustable by height adjustment screws 70. The position of the magnetic head 67 is arranged to be detected by a magnetic sensor 71. A detection coil 72 is arranged to detect the approach of the magnetic sensor 71. A sensor 73 is provided for detecting the phase of a rotary magnet 74. When power is supplied to a stator coil 75 from a driving circuit which is not shown, a rotating force acts on the rotary magnet 74 to cause the rotating member support 55 to rotate in a state of being carried by the rolling bearings 63. A magnetic tape which is not shown is wound round the peripheral faces of the rotating upper drum 51 and the fixed lower drum 52 and is arranged to travel there. With the magnetic tape caused to travel, the magnetic head 67 rotates at a speed higher than the travelling speed of the magnetic tape to thus perform scanning over the magnetic surface of the magnetic tape. Then, a magnetic video recording/reproducing apparatus which is not shown performs a recording or reproducing operation. During the operation, each signal to be given or received between the magnetic head 67 and the magnetic tape comes from or goes out to a signal processing circuit of the magnetic video recording/reproducing apparatus through the rotating-side winding 76 and the stationary-side winding 77 of the rotary transformer.

The diameter of the rolling bearings 63 is large enough to allow other components of the rotating head assembly to be arranged in the vicinity of the axis of rotation of the bearings 63. The rotary magnet 74 is attached to the rotating member support 55 within the inner space 78 of the rotating member support 55. The stator coil 75 and a stator 79 are attached to a protruding part 81 of a support member 80. The stationary-side winding 77 of the rotary transformer is secured to the upper end face of a gap adjustment member 82 which is screwed into the protruding part 81. The rotating-side winding 76 is attached to the rotating member support 55 and is disposed opposite to the stationary-side winding 77. The gap between the windings 77 and 76 is adjustable by adjusting the screwing degree of the gap adjustment member 82.

The components to be arranged in the vicinity of the axis of rotation of the bearings 63 include positioning arrangement for determining the mounting position of the rotating upper drum 51 relative to the rotating member support 55. The positioning arrangement is as follows: As shown in FIG. 3, the rotating upper drum 51 is provided with a square fitting recess 83 extending from the lower side thereof while the rotating member support 55 is provided with a square fitting protrusion 84. The fitting recess 83 is fitted on the fitting protrusion. Then, a mounting screw 85 is screwed into holes provided in the rotating upper drum 51 and the rotating member support 55 to set the rotating upper drum 51 into a prescribed position. In the embodiment shown in FIG. 3, the precision of the relative positions of the rotating upper drum 51 and the fixed lower drum 52 is highly improved because of the arrangement to mount the rotating upper drum 51 accurately in a prescribed mounting position thereof by fitting the fitting recessed part 83 onto the fitting protrudent part 84 of the rotating member support 55. Such being the arrangement, before the rotating upper drum 51 is mounted on the rotating member support 55, the rotating upper drum 51 is first fitted on an adjustment tool (not shown) which is prepared into the same shape as the rotating member support 55. Then, the head base plate 68 is attached to the rotating upper drum 51 while adjusting the height, angle and protruding extent of the magnetic head 67 to the position of the fixed lower drum which is indicated by the adjustment tool. This enables to precisely bring the magnetic head 67 into alignment with the fixed lower drum 52. This arrangement not only enhances the interchangeability of parts but also improves serviceability because any rotating upper drum 51 can be used as long as it has undergone such adjustment. More specifically stated, part replacement work required as a result of some damage of the magnetic head 67 or the like can be accomplished by merely replacing the rotating upper drum 51. This arrangement is, therefore, advantageous for reduction in cost.

Further, with regard to rotating precision, the large diameter of the rolling bearings 63 resulting from the location thereof close to the periphery of the fixed lower drum 52 serves to minimize the adverse effects of deviation of the relative positions of the rolling bearings 63 or tilting thereof on the locus of rotation of the magnetic head 67. Accordingly, distance between the rolling bearings 63 can be shortened for reduction in thickness. Further, the rotating precision of the rotating upper drum 51 is determined by the rotating precision of the rolling bearings 63 and the rotating member support 55 as well as that of the rotating upper drum 51. Therefore, compared with the conventional arrangement, the rotating precision of the rotating upper drum 51 can be increased with the number of parts that require a high degree of precision decreased.

Figure 4:
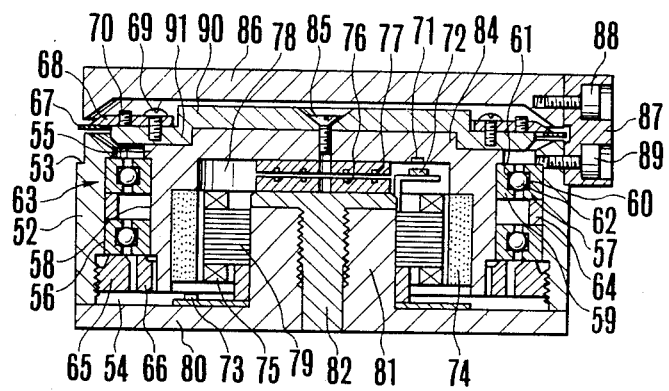
FIG. 4 is a sectional view showing an embodiment of the invention in which the invention is applied to a rotating head assembly of the head-on-propeller rotating type.

FIG. 4 shows another embodiment in which the invention is applied to a rotating head assembly of the head-on-propeller rotating type. The parts indicated in FIG. 3 by the same reference numerals are identical with the corresponding parts shown in FIG. 3. Therefore, description of such parts is omitted here. A fixed upper drum 86 is secured to a fixed lower drum 52 through a coupling member 87 and mounting screws 88 and 89 in such a way as to keep a prescribed positional relation to the fixed lower drum 52. The relative positions of the fixed upper and lower drums 86 and 52 is adjusted by inserting a thin washer or the like in between the coupling member 87 and the fixed upper or lower drum 86 or 52.

A head bar 90 on which a head base plate 68 is mounted is mounted on a rotating member support 55 at a prescribed position by fitting its fitting recessed part 91 onto a fitting protrudent part 84 and then by tightening a mounting screw 85.

The operation and the advantageous effects of the embodiment shown in FIG. 4 is almost the same as those of the embodiment shown in FIG. 3.

The following description covers the embodiments of the invention including components which are disposed within a space available in the vicinity of the axis of rotation of the bearing 63 to give an advantageous effect.

Figure 5:
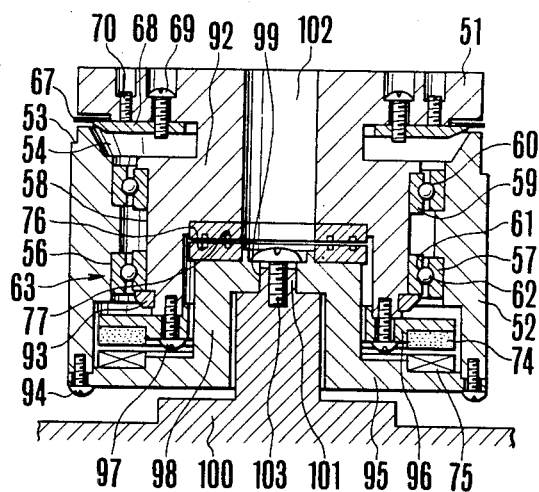
FIG. 5 is a sectional view showing a rotating head assembly of the upper drum rotating type embodying the invention and including mounting means for mounting a fixed lower drum 52 on a mount.

FIG. 5 shows an embodiment in which the invention is applied to a rotating head assembly of the upper drum rotating type. In this case, means for securing a fixed lower drum 52 to a mount is disposed in the space available in the vicinity of the above stated rotation axis. The parts identical with the corresponding parts shown in FIG. 3 is indicated by the same reference numerals in FIG. 5. A support part 92 which is formed into one unified body with a rotating upper drum 51 is disposed within the inner space 54 of a fixed lower drum 52. A fixed lower drum 52 is provided with an inner circumferential face 56 which is opposed to the support part 92. Two fixed annular members 57 are disposed on this inner circumferential face 56 of the fixed lower drum 52 and is opposed to the support part 92 close to the peripheral face of the support part.

Rolling bearings 63 are formed as shown in FIG. 5 jointly by the annular members 57, annular groove parts 60 and 61 and steel balls 62. The plays of the rolling bearings 63 in the radial and axial directions thereof are removed by biasing the steel balls towards one side within the annular groove parts.

A fixed member 95 is secured to the fixed lower drum 52 by mounting screws 94. The fixed member 95 has a stator coil 75 secured thereto. A rotary magnet 74 which is secured to a mounting member 96 is attached to the support part 92 by means of screws 97.

Figure 1:
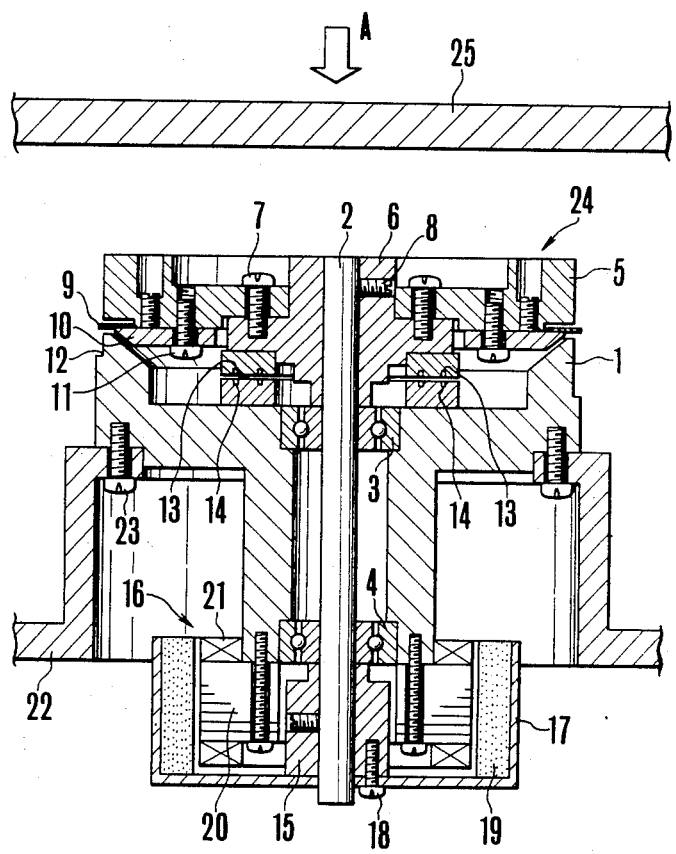
FIG. 1 is a sectional view showing by way of example a rotating head assembly of the conventional upper drum rotating type.
Figure 2:
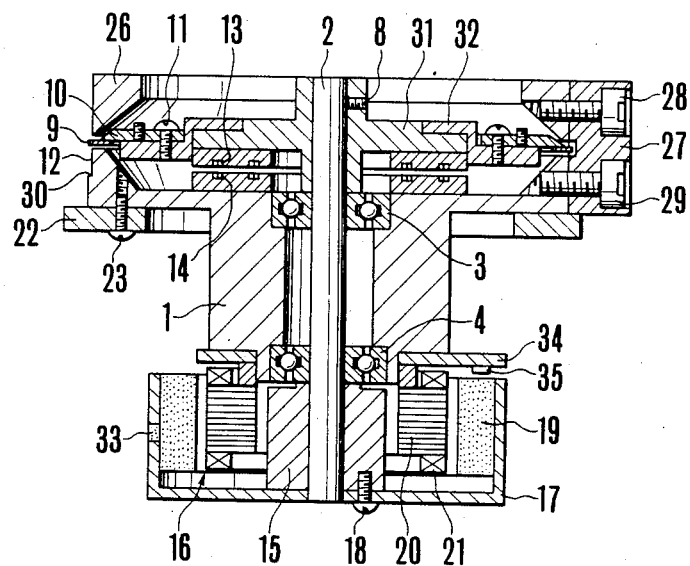
FIG. 2 is a sectional view showing a rotating head assembly of the conventional head-on-propeller rotating type.

The fixed member 95 is provided with a downward recessed part 98 which has a fitting hole 99 in the middle part thereof. Meanwhile, a pin 101 is formed on a mount 100. The pin 101 is fitted into the fitting hole 99 of the fixed member 95. The whole rotating head assembly is mounted on the mount 100 by tightening a mounting screw 103 through a void hole 102 which is provided in the middle part of the rotating upper drum 51. In accordance with this embodiment, the large diameter of the rolling bearings 63 permits provision of the void hole 102 in the middle part of the rotating upper drum 23, which greatly facilitates the tightening work on the mounting screw 103. This contributes to improvement in workability. Compared with the conventional arrangement shown in FIG. 1, use of only one mounting screw 103 suffices in this case and this further contributes to improvement in workability.

Figure 6:
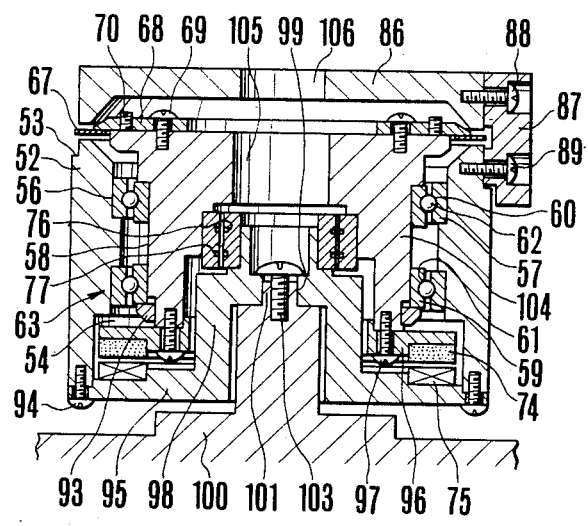
FIG. 6 is a sectional view showing a rotating head assembly of the head-on-propeller rotating type as an embodiment of the invention including the above stated mounting means.

Another embodiment shown in FIG. 6 is a rotating head assembly of the head-on-propeller rotating type, in which means for securing a fixed lower drum 52 to a mount 100 is arranged in a space available in the vicinity of the axis of rotation mentioned in the foregoing. In FIG. 6, the parts of the embodiment which are identical with the corresponding parts shown in FIGS. 4 and 5 are indicated by the same reference numerals as FIGS. 4 and 5. A rotating member 104 and a fixed upper drum 86 are respectively provided with void holes 106 and 107 which are located in the neighborhood of the above stated axis of rotation. A mounting screw 103 is arranged to be tightened through these void holes 106 and 107.

Figure 7:
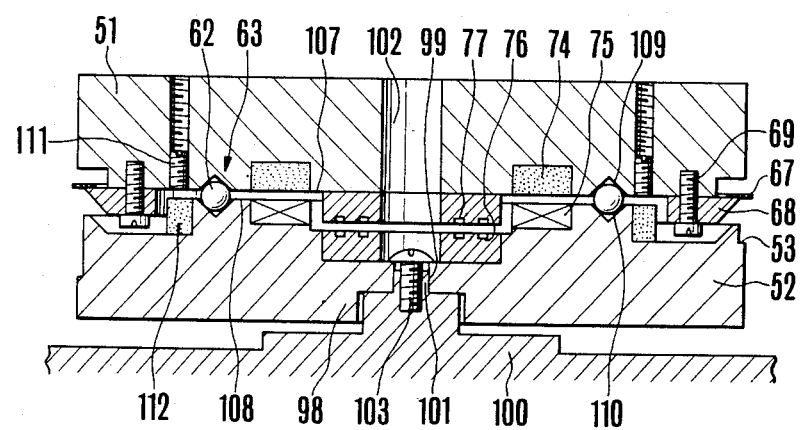
FIG. 7 is a sectional view showing a rotating head assembly having the above stated mounting means as an embodiment of the invention in which a bearing serving as supporting means is disposed on a plane perpendicular to the axis of rotation.

FIG. 7 shows a further embodiment of the invention as another variation of the type having means for securing a fixed lower drum 52 to a mount 100 within a space provided in the vicinity of the above stated axis of rotation. In FIG. 7, the same components as those shown in FIG. 5 are indicated by the same reference numerals. The lower side 107 of a rotating upper drum 51 and the upper side 108 of a fixed lower drum 52 are respectively provided with annular groove parts 109 and 110. A plurality of steel balls 62 are inserted in between these annular groove parts 109 and 110. The two groove parts and the steel balls jointly form a rolling bearing 63. On the opposed sides of the fixed lower drum 52 and the rotating upper drum 51 are mounted a stationary-side winding 76 and a rotating-side winding of a signal transmitting rotary transformer, a stator coil 75 of a motor, a rotary magnet 75, a pre-load magnet 112 for carrying the rotating upper drum 51 and adjusting a pre-load imposed on the rolling bearing 63, and a pre-load adjustment screw 111. A head base plate 68 which has a magnetic head 67 is mounted on the rotating upper drum 51 by means of mounting screws 69. An attractive force between the pre-load magnet 112 and the pre-load adjustment screw 111 is adjustable by adjusting the screwing degree of the screw 111. With this arrangement, the state of carrying the rotating upper drum 51 and the pre-load imposed on the steel balls 62 of the rolling bearing 63 are adjusted in a non-contact manner.

In this embodiment, the rolling bearing 63 is arranged on a plane perpendicular to the axis of rotation of the rotating upper drum 51 and is positioned close to the peripheral faces of the two drums 51 and 52. This arrangement permits reduction in thickness to a great extent. The rotational precision of the rotating upper drum 51 is determined only by rolling bearing 63 in addition to the rotating precision of the rotating upper drum 51. The embodiment therefore permits reduction in the number of parts that requires a high degree of precision and enables to enhance the rotational precision with a less number of parts and at a low cost. In addition to this advantage, the embodiment gives improved workability for mounting the assembly on a mount 100 in the same manner as in the cases of the preceding embodiments shown in FIGS. 5 and 6.

Figure 8:
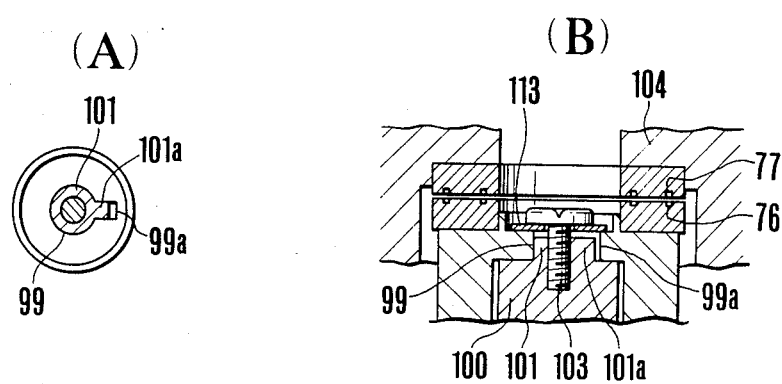
FIG. 8(A) is a plan view and FIG. 8(B) a sectional view of a mounting arrangement embodying a feature of the invention.

The mounting angle of the whole rotating head assembly to the mount 100 in the circumferential direction is determined by relation to the tape travel surface of the assembly. In view of this, it is preferable to have a fitting hole 99 and a pin 101 arranged in such a manner that the above stated mounting angle in the circumferential direction is automatically determined when they come into fitting engagement. An example of such fitting arrangement is as shown in FIG. 8. In this case, the pin 101 is provided with a projection 101a on one side thereof while the fitting hole 99 is provided with a sidewise extending hole part 99a which is formed in a position to correspond to the projection 101a. When the fitting hole 99 is fitted on the pin 101, the mounting angle in the circumferential direction of the rotating head assembly to the mount 100 is automatically determined. In FIG. 8, a reference numeral 113 indicates a washer.

Figure 9:
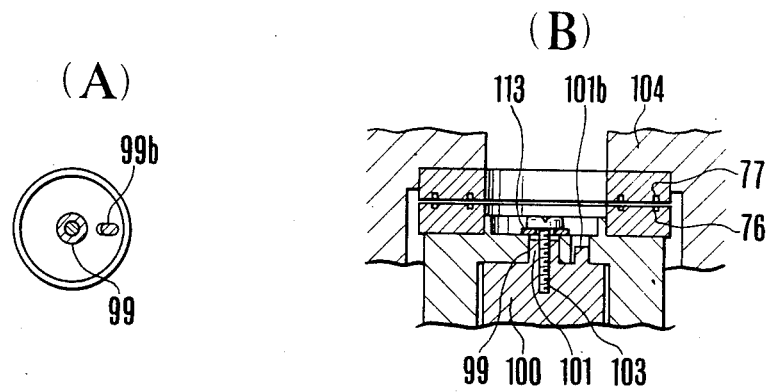
FIG. 9(A) is a plan view and FIG. 9(B) a sectional view of a fitting arrangement embodying features of the invention.

Another example of the fitting arrangement of the fitting hole 99 and the pin 101 is as shown in FIG. 9. In this case, the mount 100 is provided with another pin 101b which is arranged in a position away from the pin 101 for the purpose of positioning. The recessed part 98 of a fixed member on the other hand is provided with a slot 99b which is arranged separately from the fitting hole 99. The positioning pin 101b comes into fitting engagement with the slot 99b when the fitting hole 99 is fitted on the pin 101. This automatically determines the mounting angle of the rotating head assembly to the mount 100. With the rotating head assembly thus mounted, a mounting screw 103 is tightened through a washer 113.

Figure 10:
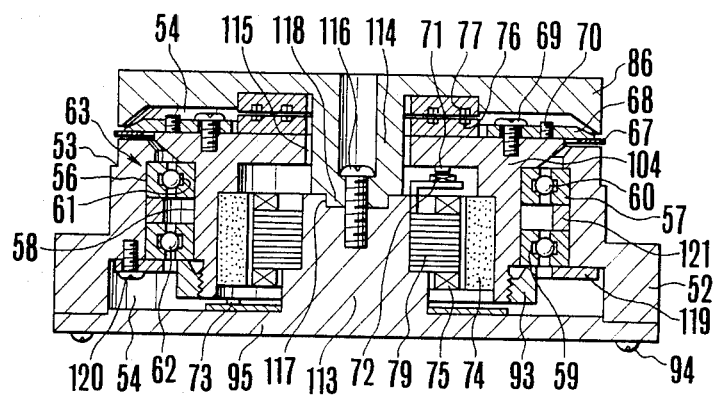
FIG. 10 is a sectional view showing a rotating head assembly as an embodiment of the invention including fixing means for securing a fixed upper drum to a fixed lower drum.

FIG. 10 shows a rotating head assembly of the head-on-propeller rotating type as another embodiment of the invention, in which means for securing a fixed upper drum 86 to a fixed lower drum 52 is disposed in a space provided in the vicinity of the above stated axis of rotation. In FIG. 10, the same components as those shown in FIGS. 4 or 6 are indicated by the same reference numerals. A support member 95 is provided with a protrudent part 113 which is disposed in the central part of the fixed lower drum 52. The fixed upper drum 86 is provided with a cylindrical connection part 114 formed in the central part thereof. The connection part 114 pierces through a hole 115 provided in the central part of a rotating member 104 around the rotation axis thereof and thus comes into contact with the protrudent part 113. The connection part 114 is thus secured to the protrudent part 113 by a mounting screw 116. There are provided two rolling bearings 63 which are spaced by means of a spacer 121 and are fixed in their positions by a washer 119, mounting screws 120 and a tightening ring 93.

A square fitting recessed part 117 is provided on the upper side of the protrudent part 113 of the support member 95. Meanwhile, a square fitting protrudent part 118 is provided on the lower side of the connecting part 114 of the fixed upper drum 86. The protrudent part 118 is arranged to be fitted into the recessed part 117. The fixed upper drum 86 is secured to the support member 95 in such a way as to keep the upper and lower fixed drums 86 and 52 in a predetermined relative positions with the protrudent part 118 fitted into the recessed part 117 and with the mounting screw 116 tightened.

In this embodiment, the connection part 114 and the protrudent part 113 are disposed in the middle parts of the fixed upper and lower drums 86 and 52 with no rotation shaft provided in the middle parts. The two parts 113 and 114 are connected to each other by tightening the mounting screw 116 in the axial direction thereof. This arrangement dispenses with the coupling member 87 which is shown in FIG. 4 and eliminates the possibility of deformation of the fixed upper drum 86. The relative positions of the upper and lower fixed drums 86 and 52 are adjusted by pushing the peripheral face of the fixed upper drum against a reference plane and then by tightening the mounting screw 116 or in some other suitable manner. Therefore, the adjustment can be accomplished very simply.

Figure 11:
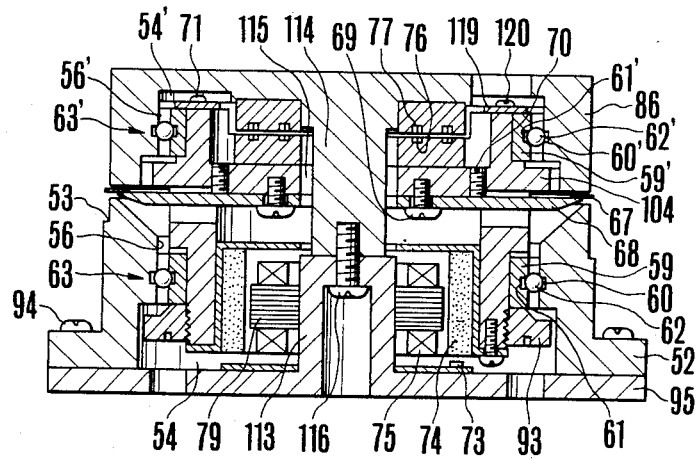
FIG. 11 is a sectional view of another embodiment of the invention including the above stated fixing means.

FIG. 11 shows a further embodiment which also includes means for securing a fixed upper drum 86 to a fixed lower drum 52 with the means arranged in the vicinity of the above stated axis of rotation in a manner similar to the preceding embodiment shown in FIG. 10. The same components of the embodiment are indicated by the same reference numerals as FIG. 10. A rotating member 104 is disposed within the inner spaces 54 and 54' of upper and lower fixed drums 86 and 52. Annular groove parts 60 and 60' are respectively formed in the inner circumferential faces 56 and 56' of the upper and lower fixed drums 86 and 52 and are located close to their peripheral faces. Meanwhile, there are provided rotating annular members 59 and 59' on the rotating member 104. These rotating annular members 59 and 59' are provided with annular groove parts 61 and 61' which are formed opposite to the annular groove parts 60 and 60'. A plurality of steel balls 62 and 62' are inserted respectively in between the opposed annular groove parts 60 and 61 and between the other opposed annular groove parts 60' and 61'. A rolling bearing 63 is formed jointly by the annular groove parts 60 and 61 and the steel balls 62 while another rolling bearing 63' is formed by the opposed annular groove parts 60' and 61' and the steel balls 62'. These rolling bearings 63 and 63' rotatably carry the rotating member 104 on the fixed lower drum 52.

The advantageous effects attainable by the embodiment shown in FIG. 11 are about the same as the effects attainable by the embodiment shown in FIG. 10.

Figure 12:
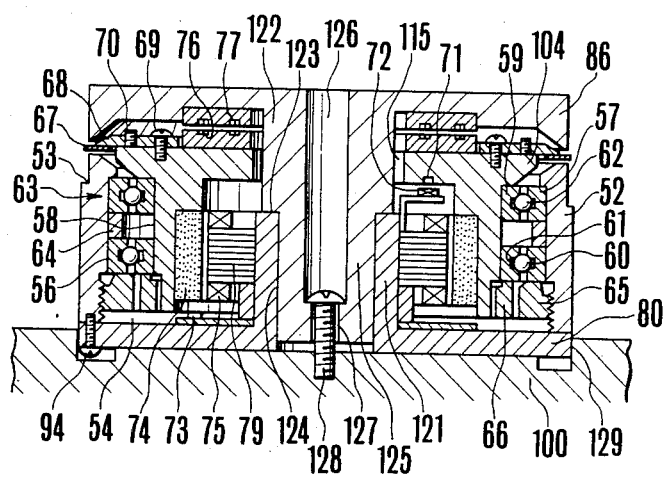
FIG. 12 is a sectional view showing still another embodiment of the invention in which the above stated fixing means is arranged to secure a fixed upper drum to both a fixed lower drum and a mount 12.

FIG. 12 shows also a rotating head assembly of the head-on-propeller rotating type as a further embodiment of the invention. In this case, the embodiment includes means for securing a fixed upper drum 86 not only to a fixed lower drum 52 but also to a mount 100 with the securing means arranged in the vicinity of the aforementioned axis of rotation. The components of this embodiment that are the same as those shown in FIGS. 4, 6 and 10 are indicated by the same reference numerals. A support member 80 has a protrudent part 121 which is disposed in the middle part of a fixed lower drum 52. The protrudent part 121 is provided with a circular or square fitting hole 124. A connection part 122 is provided in the middle part of the fixed upper drum 86. The connection part 122 is arranged to pierce through a hole 115 provided in the middle part of a rotating member 104. The connection part 122 is provided with a stepped part 123. The portion of the connection part 122 from the stepped part 123 to the fore end thereof is formed into a circular or square shaped fitting part 125, which is fitted into the above stated fitting hole 124. In the middle part of the connection part 122, there is formed a recess 126 with a screw hole 127 provided therein. With the fitting part 125 fitted into the fitting hole 124, the upper and lower fixed drums 52 and 86 are secured to each other with a mounting screw 128 screwed through the screw hole 127 into a mount 100. The two drums are thus simultaneously secured to the mount 100. The mount 100 has a fitting hole 129 which is provided with a member, which is not shown but is arranged to determine the mounting angle of the assembly relative to the mount 100 in the circumferential direction thereof. The mounting angle in the circumferential direction of the fixed lower drum 52 is automatically determined with the support member 80 fitted into the fitting hole 129. In this embodiment shown in FIG. 12, the connection part 122 and the protrudent part 121 are disposed in the middle parts of the upper and lower fixed drums 86 and 52 with no rotation shaft provided there. The two drums and the mount 100 are connected to each other by the mounting screw 128 in the middle part of the assembly. This arrangement thus dispenses with the coupling member 87 shown in FIG. 4 to preclude any possibility of deformation of the fixed upper drum 86. Besides, the relative positions of the fixed upper drum and the support member 80 are determined by the fitting engagement of the fitting part 125 and the fitting hole 124. Therefore, the relative positions of the upper and lower fixed drums 86 and 52 are adjusted through the adjustment of the positions of the fixed lower drum 52 and the support member 80. This adjustment can be very simply accomplished in such a manner as to push the peripheral face of the fixed lower drum 52 against a reference plane which is not shown and then to tighten a mounting screw 94. Further, the provision of the fitting part 125 and the fitting hole 124 makes it possible that, when the fixed upper drum 86 is removed for replacing the magnetic head 67, it may be again mounted without readjustment of the relative positions of the upper and lower fixed drums 86 and 52. Since the mounting screw 128 is positioned in the middle part, a screw driver can be inserted without any obstacle, so that the tightening work thereon can be greatly facilitated.

The fitting hole 129 of the mount 100 is provided with a member (not shown) that is arranged to determine the mounting angle in the circumferential direction as mentioned above. The mounting angle of the fixed lower drum 52 relative to the mount 100 therefore can be automatically determined. Further, in cases where the mounting screw 128 loosens, the arrangement of the embodiment prevents deviation of the fixed lower drum from the position and the mounting angle thereof in the circumferential direction.

The arrangement to simultaneously mount the upper and lower fixed drums 86 and 52 onto the mount 100 with the mounting screw 128 greatly simplifies mounting work and permits reduction in the number of parts and cost.

Figure 13:
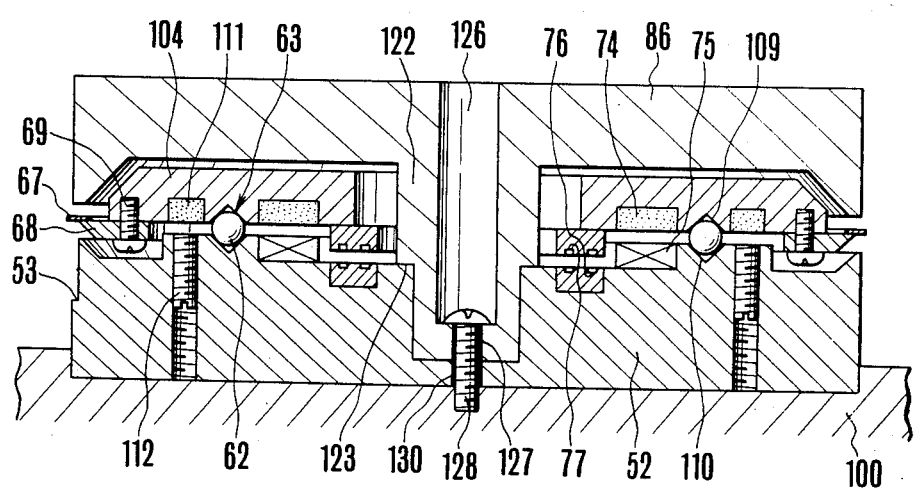
FIG. 13 is a sectional view showing a further embodiment of the invention in which the above stated fixing means is also arranged to secure a fixed upper drum to both a fixed lower drum and a mount.

FIG. 13 shows another structural arrangement of a rotating head assembly embodying the invention. In this embodiment, different means from that of the preceding embodiment is used for securing the upper and lower fixed drums 86 and 52 to the mount 100 simultaneously with securing the upper drum 86 to the lower drum 52. In FIG. 13, the same components as those shown in FIGS. 7 and 12 are indicated by the same reference numerals as those used in these figures.

This embodiment includes fitting holes 127 and 130 which are respectively provided in the upper and lower fixed drums 86 and 52 for receiving a mounting screw 128. There is provided a rotating member 104 which is opposed to the fixed lower drum 52 on a plane perpendicular to the axis of rotation. This embodiment also gives about the same advantageous effects as the embodiment shown in FIG. 12.

Figure 14:
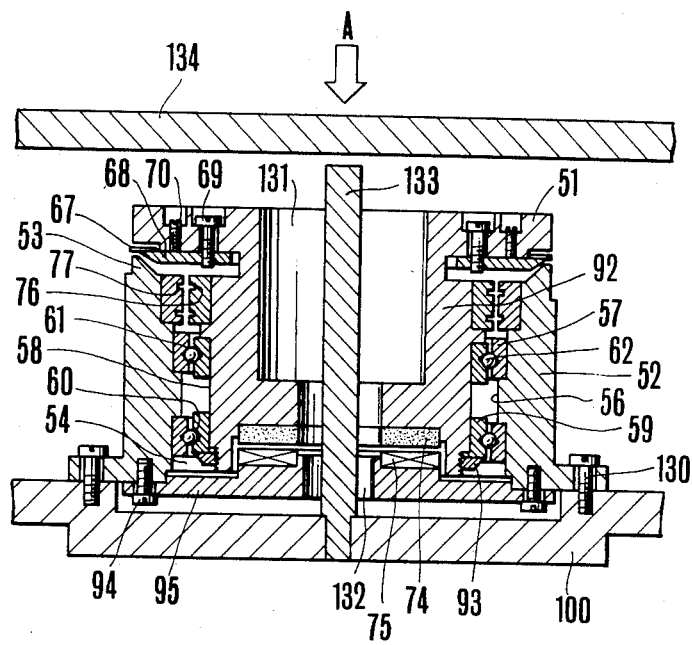
FIG. 14 is a sectional view showing an embodiment including a support member arranged to support a cover member.

FIG. 14 shows a rotating head assembly of the upper drum rotating type embodying the invention as another example. In this embodiment, a holding member is provided for holding a cover member for covering the rotating head assembly and the cover holding member is disposed in a space available in the vicinity of the aforementioned axis of rotation. In FIG. 14, the like components are also indicated by like reference numerals as in other drawings. In this case, mounting on the mount 100 is effected with a plurality of mounting screws 130. A rotating upper drum 51 and a fixed member 95 are respectively provided with void holes 131 and 132 which are located in the middle parts of them. The holding member or post 133 is disposed through the holes 131 and 132. The holding member 133 has its lower end secured to the mount 100 and its upper end extended upward from the upper side of the rotating upper drum 51 to come into contact with the cover 134. In accordance with the embodiment shown in FIG. 14, the provision of the holes 131 and 132 permits the holding member 133 to be disposed there. When an external force is applied to the cover 134 as shown with an arrow A in the middle of the drawing to deform the cover 134, the holding member 133 holds the cover and prevents it from coming into contact with the rotating upper drum 51. The provision of the holding member, therefore, permits reduction in distance between the cover 134 and the rotating head assembly. Therefore, this permits reduction in thickness of the material of the cover 134.

Figure 15:
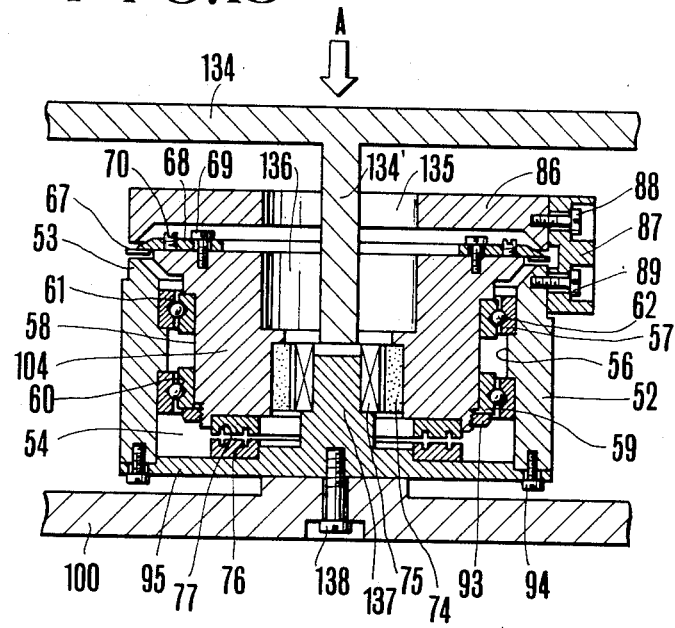
FIGS. 15 and 16 are sectional views respectively showing other embodiments including the above stated support member.

FIG. 15 shows an embodiment of the head-on-propeller rotating type which is also provided with the above stated holding member. FIG. 15 shows the same components with the same reference numerals as in FIG. 14. A fixed upper drum 86 and a rotating member 104 are provided with holes 135 and 136 which are disposed in the middle parts of them. A fixed member 137 has a protrudent part 137 which is inserted into the lower half portion of the hole 136 of the rotating member 104. A stator coil 75 of a face-opposed type motor is attached to this protrudent part 137. The fixed member 95 is mounted on the mount 100 by means of a screw 138. The cover 134 and the holding member 134' are formed into one unified body with each other. The holding member 134' is disposed within the holes 135 and 136. The lower end of the holding member 134' is located slightly above the upper end face of the protrudent part 137. This embodiment also gives the same advantageous effects as those obtainable from the embodiment shown in FIG. 14.

Figure 16:
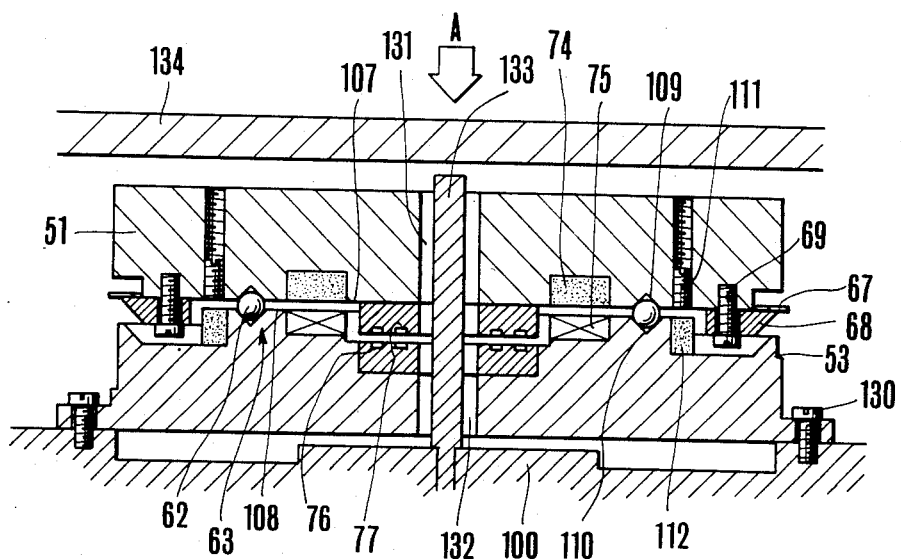

FIG. 16 shows another embodiment as a variation of the preceding embodiment also having a holding member similar to the one used in the preceding embodiment. In this case, a bearing 63 is arranged on a plane perpendicular to the axis of rotation.

Figure 17:
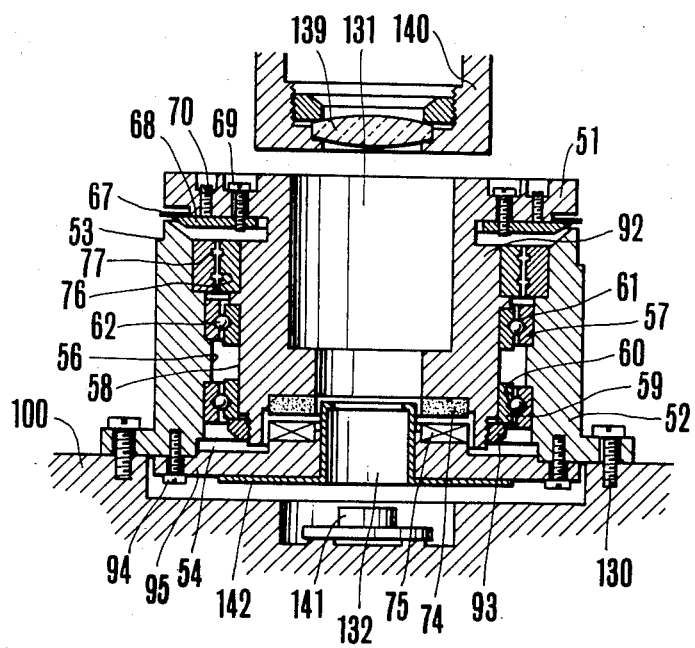
FIG. 17 is a sectional view showing an embodiment of the invention in which an optical path for an optical system is arranged in the vicinity of the axis of rotation.

FIG. 17 shows another rotating head assembly of the upper drum rotating type embodying the invention. In this embodiment, the void hole available in the vicinity of the axis of rotation is utilized for providing an optical path for an optical system. In FIG. 17, the reference numerals used in FIG. 14 are used to indicate like components. A void hole 131 is provided at the center of rotation of a rotating upper drum 51. Another void hole 132 which communicates with the void hole 131 is provided in a fixed member 95. A photo taking optical system 139 and a lens barrel 140 which carries the optical system 139 are disposed above the void hole 131 and are opposed thereto. The void holes 131 and 132 form the optical path of the optical system 139. Meanwhile, a solid image pickup element 141 such as CCD or BBD which is positioned on an imaging plane is secured to a mount 95. A shield member 142 which serves combined functions as a shield case for a stator coil 75 and a rotary magnet 74 and a light shielding mask for the optical system 139 is secured to the fixed member 95. An optical image incident from the optical system 139 is converted into an electrical signal by the solid image pickup element 141. The electrical signal is processed through a signal processing circuit which is not shown and then comes to a magnetic head 67 through the stationary-side winding 77 and the rotating-side winding 76 of a rotary transformer to be recorded on a magnetic head.

Figure 18:
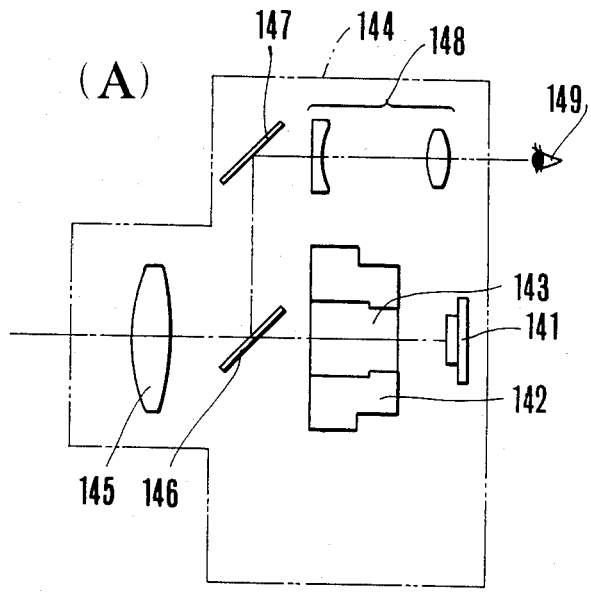
FIGS. 18(A) and 18(B) are illustrations respectively showing a rotating head assembly such as the one shown in FIG. 17 in relation to an optical system.
Figure 18:
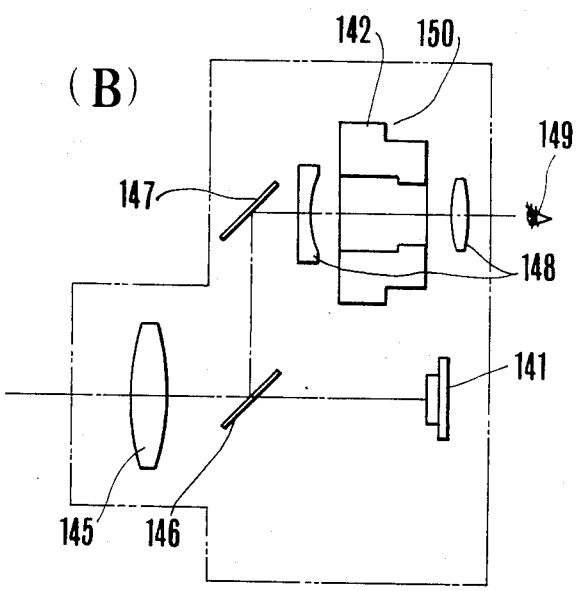

In the case of the embodiment shown in FIG. 17, the void holes 131 and 132 are provided respectively in the rotating upper drum 51 and the fixed lower drum 51 and these holes 131 and 132 are utilized as the optical path of the optical system. This arrangement is advantageous particularly for reduction in size of a system where a camera and a magnetic video recording/reproducing apparatus are combined into one unit. The relation of the rotating head assembly to the optical system in a system such as shown in FIG. 17 is as shown in FIG. 18.

In the case of FIG. 18(A), the optical path formed in the rotating head assembly 142 is used for a photo taking optical system and is indicated by reference numeral 143. The body of the system consists of a magnetic recording/reproducing apparatus and a camera which are combined into one unit. An optical image passes through the photo taking optical system 145 and then comes through a half mirror 146 and a photo taking optical path 143 to image on a solid image pickup element 141. Meanwhile, a part of the light is reflected at the half mirror 146. The reflected light comes to an eye of the photographer through a mirror 147 and a view finder optical system 148. FIG. 18(B) shows another case in which the optical path formed in the rotating head assembly 142 is used for a view finder optical system and is indicated by reference numeral 150.

Figure 19:
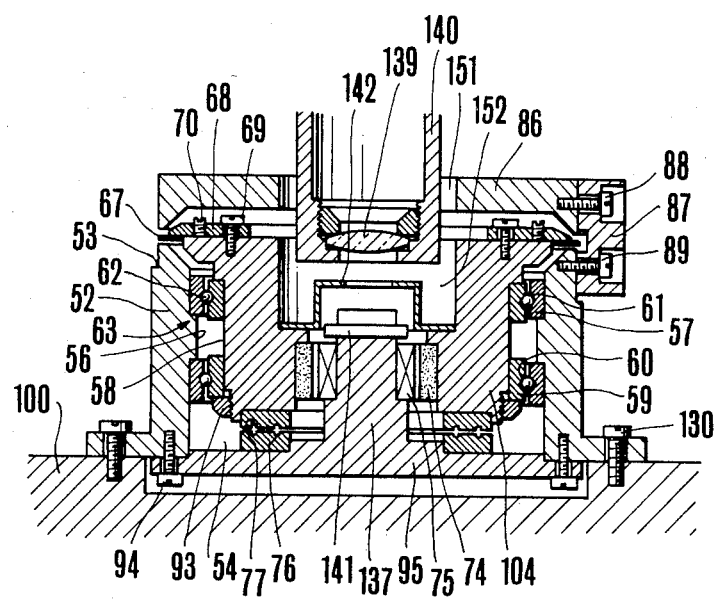
FIGS. 19-23 are sectional views showing other embodiments each providing an optical path for an optical system by arranging the optical path in the vicinity of the axis of rotation.

FIG. 19 shows a rotating head assembly of the head-on-propell rotating type as another embodiment of the invention. In this embodiment, a void hole provided in the vicinity of the axis of rotation is used as the optical path of an optical system. In FIG. 19, the same reference numerals as those used in FIGS. 15 and 17 indicate like components. A void holes 151 and 152 are formed in the middle parts of a fixed upper drum 86 and a rotating member 104. A protrudent part 137 which is formed on a fixed member 95 is positioned in the lower half portion of the void hole 152. A solid image pickup element 141 is secured to this protrudent part 137. A lens barrel 140 which carries either a photo taking optical system 139 or a view finder optical system is secured to a recessed parts of the void holes 151 and 152.

Figure 20:
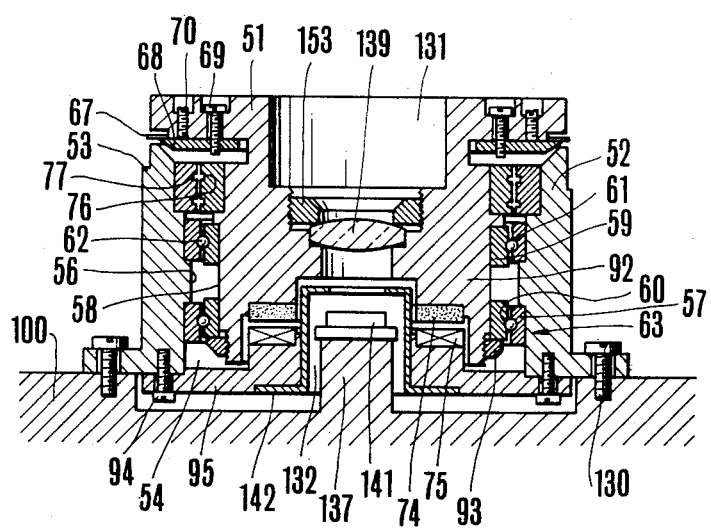

FIG. 20 shows another embodiment of the invention in which a photo taking optical system 139 is carried by a support member 153 which is provided on a rotating upper drum 51.

Figure 21:
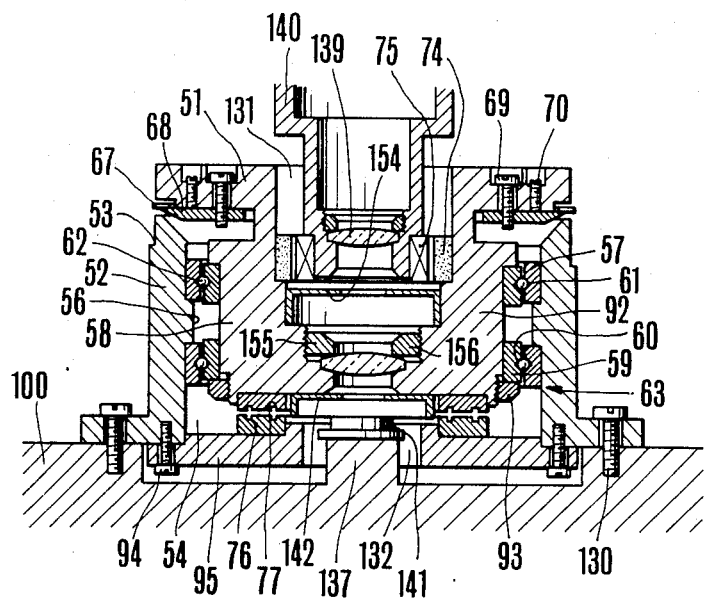

FIG. 21 shows a further embodiment of the invention in which a stator coil 75 is secured to a lens barrel 140 while a rotary magnet 74 is secured to a rotating upper drum 51 and is opposed to the stator coil 75. A reference numeral 154 indicates a shield member arranged to serve combined functions as a shield member and a light shielding member; 155 indicates a support member; and 156 indicates a photo taking optical system.

Figure 22:
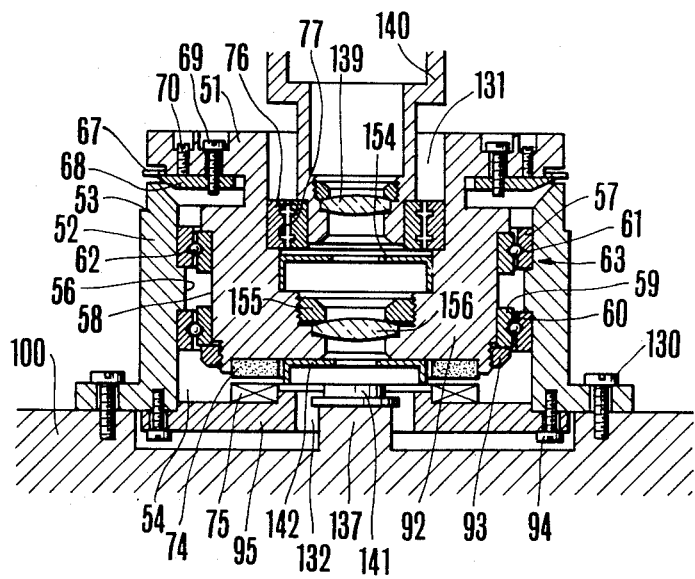

FIG. 22 shows a further embodiment of the invention in which the stationary-side winding 77 and the rotating-side winding 76 are respectively attached to a lens barrel 140 and a rotating upper drum 51.

Figure 23:
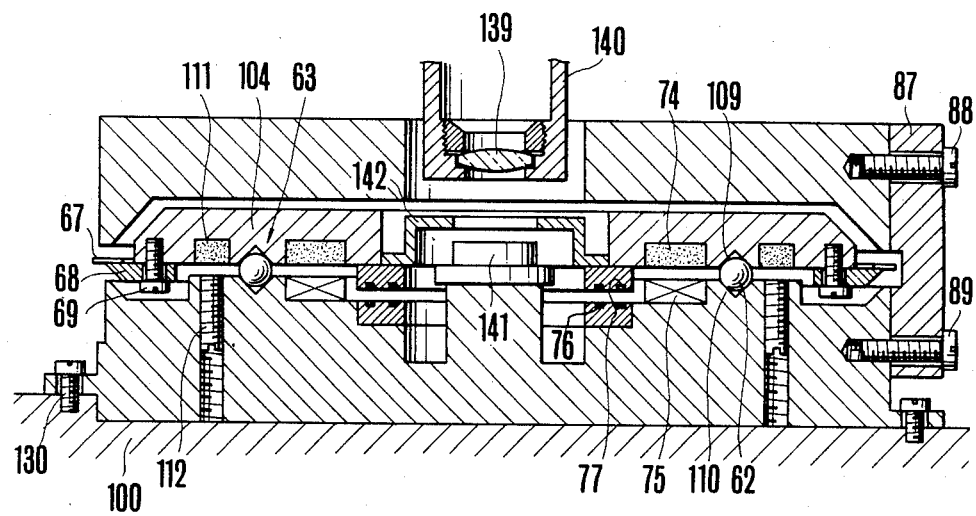

FIG. 23 shows another embodiment of the invention in which the above-mentioned optical path is arranged in a rotating head assembly having a rolling bearing 63 provided on a plane perpendicular to the axis of rotation.

In FIGS. 20–23, the same reference numerals as those used in FIGS. 14–17 indicate like components.

The embodiments shown in FIGS. 19–23 give about the same advantageous effects as the embodiment shown in FIG. 17.

Figure 24:
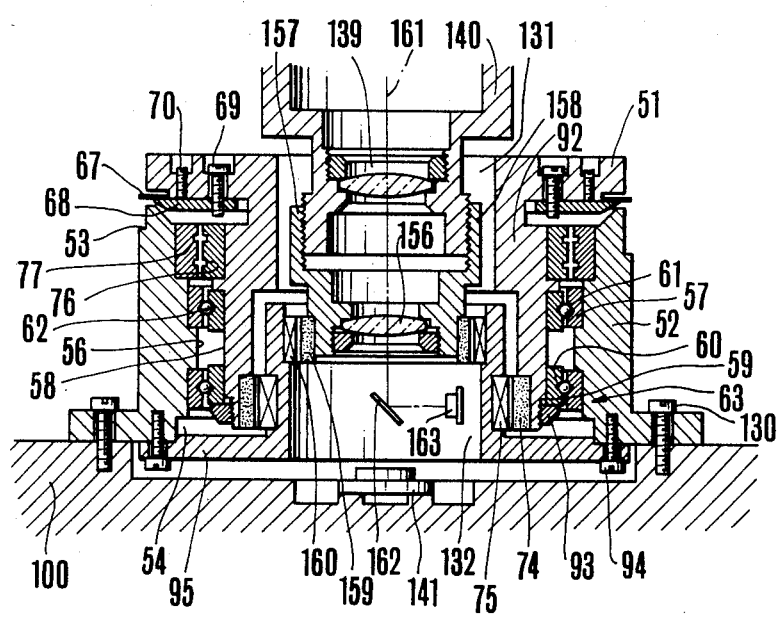
FIG. 24 is a sectional view showing a still further embodiment of the invention in which there is provided means for driving an optical system within a void hole provided in the vicinity of the axis of rotation.

FIG. 24 shows a still further embodiment in which means for driving an optical system is disposed within the void hole mentioned in the foregoing.

Automatic focusing mechanisms for automatically focusing on an object to be photographed have begun to be employed in cameras. Recently, these automatic focusing mechanisms come to include TTL automatic focusing mechanisms which are arranged to branch an optical path from a photo taking optical system through a half mirror or the like; to supply the light of the branched optical path to a photo-electric conversion element; and then to perform focus adjustment in accordance with the output of this photo-electric conversion element. In such a TTL automatic focusing mechanism, with the optical system arranged in the manner as mentioned above, the focusing adjustment is accomplished by moving a lens of the photo taking optical system immediately before or close to an imaging plane. In the case of the embodiment shown in FIG. 24, the nonexistence of any rotating shaft permits to arrange a photo taking optical system and an automatic focusing mechanism in the void holes 131 and 132. More specifically, a portion of a fixed lens barrel 140 carrying a fixed lens 139 of the photo taking optical system is disposed within the void hole 131. Meanwhile, a movable lens barrel 158 which is in screwed engagement with the threaded part 157 of the fixed lens barrel 140 is located also within the void hole 131. The movable lens barrel 158 carries the automatic focusing lens 156 of the photo taking optical system. A magnet 159 and a coil 160 are secured to the movable lens barrel 158 and to a fixed member 95 and are thus arranged to serve as means for driving the automatic focusing lens 156 in the direction of the optical axis of the optical system.

A solid image pickup element 141 such as CCD or BBD which is located at the imaging plane of the photo taking optical system 139 and 156 is secured to a mount 48. A half mirror 162 supplies a portion of the light of the photo taking optical path 161 to a photo-electric conversion element 163. The photo-electric conversion element 163 and the solid image pickup element 141 are arranged in optically equivalent positions. Therefore, when an optical image is out of focus at the photo-electric conversion element 163, it is also out of focus at the solid image pickup element 141.

When a portion of the light of the photo taking optical path 161 is supplied through the half mirror to the photo-electric conversion element 163, the light thus supplied is converted into an electrical signal by the photo-electric conversion element 163. The degree of out-of-focus of the optical image is determined by an automatic focusing circuit (not shown) through the output of the photo-electric conversion element 163. The circuit then causes an exciting current of a magnitude corresponding to the determined out-of-focus degree to the coil 160. With the current supplied, the magnet 159 and the movable lens barrel 158 rotate. Then, the threaded part 157 guides the movable lens barrel 158 and the automatic focusing lens 156 to allow them to move together in the direction of the optical axis. When the lens come to an in-focus position, the exciting current of the stator coil 160 becomes zero to set the automatic focusing lens 156 in that position.

The light which comes to the solid image pickup element 141 through the photo taking optical system 139 and 156 and the half mirror 162 is converted into an electrical signal. The signal comes to a signal processing circuit which is not shown and, after that, comes through the stationary-side winding 77 and rotating-side winding 76 of a rotary transformer to a magnetic head 67 to be recorded on a magnetic tape.

In the embodiment shown in FIG. 24, the parts of an automatic focusing mechanism including the photo taking optical system 139 and 156, the moving lens barrel 158, the magnet 159, the coil 160, the half mirror 162, the photo-electric conversion element 163, etc. and the solid image pickup element 141 can be arranged within the void hole 131 of the rotating upper drum 51 and the void hole 132 of the fixed member 95. This arrangement of the embodiment, therefore, advantageously contributes to reduction in size of a system in which a camera having an automatic focusing mechanism and a magnetic video recording/reproducing apparatus are arranged into one unified body.

As will be apparent from the foregoing description of embodiments, the invention enables to obtain a rotating head assembly which is not only compact but excels in workability and operability.

What we claim:

1. A rotating system, comprising:
   (a) a stationary member;
   (b) a rotating member continuously rotatable relative to said stationary member, said rotating member having at least one head for recording and/or reproducing information signals on and/or from a recording medium, said rotating member having an opening for passage of light therethrough;
   (c) supporting means for rotatably supporting said rotating member relative to said first stationary member; and
   (d) optical means for processing said light into recordable information signals, at least one portion of said optical means being arranged in the direction of the passage of light through the opening.
2. A system according to claim 1, wherein said head is arranged at a position farthest from the axis of said rotating member.
3. A system according to claim 2; wherein said stationary member includes a stationary drum, said drum having a stationary cylinder-shaped guide face for guiding a recording medium.
4. A system according to claim 3; wherein said rotating member includes a rotating drum, said drum having a stationary cylinder-shaped guide face for guiding said recording medium.
5. A system according to claim 1, wherein said optical means includes a plurality of lenses.
6. A system according to claim 5, wherein the path of the light information is in coincidence with the axis of said rotating member.
7. A system according to claim 1, further comprising: driving means arranged to drive at least partly said optical means.
8. A system according to claim 7, wherein the path of the light information is in coincidence with the axis of said rotating member.
9. A system according to claim 8, wherein at least a portion of said driving means is fixedly secured to said rotating member.
10. A system according to claim 9, wherein said optical means includes at least one lens to be driven by said driving means.
11. A system according to claim 7, wherein at least a portion of said driving means is fixedly secured to said stationary member.
12. A system according to claim 1, wherein said optical means includes an image pickup device.
13. A system according to claim 12, wherein said image pickup device is fixedly secured to said stationary member.
14. A rotating system, comprising:
    (a) a stationary member;
    (b) a rotating member continuously rotatable relative to said stationary member, said rotating member having at least one head for recording and/or reproducing information signals on and/or from a recording medium, said rotating member having an opening for passage of light therethrough;
    (c) supporting means for rotatably supporting said rotating member relative to said first stationary member;
    (d) optical means for processing light information, at least one portion of said optical means being arranged at the same position as said supporting means in the direction of the axis of rotation of said rotating member and also arranged on the inner side of said supporting means;
    (e) said optical means includes a plurality of lenses;
    (f) the path of the light information is in coincidence with the axis of said rotating member; and
    (g) at least one of said plurality of lenses being fixedly secured to said rotating member.

* * * * *